(12) United States Patent
Shyu et al.

(10) Patent No.: US 7,649,654 B2
(45) Date of Patent: Jan. 19, 2010

(54) IN-LINE LASER SCANNING UNIT WITH MULTIPLE LIGHT BEAMS

(75) Inventors: San-Woei Shyu, Taipei (TW); Ming-Hua Wen, Taipei (TW); Guo-Zen Chen, Taipei (TW); I-Lin Chu, Taipei (TW); He-Pin Wong, Taipei (TW)

(73) Assignee: E-Pin Optical Industry Co., Ltd., Taipei (TW)

(*) Notice: Subject to any disclaimer, the term of this patent is extended or adjusted under 35 U.S.C. 154(b) by 763 days.

(21) Appl. No.: 11/448,052

(22) Filed: Jun. 7, 2006

(65) Prior Publication Data

US 2007/0176084 A1    Aug. 2, 2007

(30) Foreign Application Priority Data

Jan. 27, 2006   (TW) ............................... 95103353 A

(51) Int. Cl.
    H04N 1/04    (2006.01)
    G01J 5/02    (2006.01)
    G02B 26/08   (2006.01)
(52) U.S. Cl. ................... 358/474; 358/481; 358/484; 250/349; 359/210.1
(58) Field of Classification Search ............ 250/341.7, 250/342, 349, 367, 559.06, 559.07, 559.08; 359/210.1, 210.2, 213.1, 224.2, 226.1, 204.1, 359/204.2, 204.4; 347/232, 233, 244; 358/474, 358/505, 508, 509, 513, 481, 484, 475, 482
See application file for complete search history.

(56) References Cited

U.S. PATENT DOCUMENTS

| | | | | |
|---|---|---|---|---|
| 5,251,055 A | * | 10/1993 | Koide ..................... | 359/216.1 |
| 5,867,299 A | * | 2/1999 | Takano et al. ............ | 359/201.1 |
| 5,963,354 A | * | 10/1999 | Shiraishi et al. .......... | 359/204.1 |
| 6,097,508 A | * | 8/2000 | Hattori ................... | 358/475 |
| 6,239,828 B1 | * | 5/2001 | Ito et al. .................. | 347/241 |
| 6,288,818 B1 | * | 9/2001 | Yoshimaru ............... | 359/204.1 |
| 6,347,003 B1 | * | 2/2002 | Shiraishi et al. .......... | 359/204.1 |
| 6,642,951 B2 | * | 11/2003 | Tanaka ..................... | 347/241 |
| 6,781,728 B2 | * | 8/2004 | Hama et al. .............. | 359/204.1 |
| 6,800,845 B2 | * | 10/2004 | Sakai et al. ............... | 250/234 |
| 6,831,763 B2 | * | 12/2004 | Takakubo ................ | 359/207.2 |
| 7,075,688 B2 | * | 7/2006 | Nakajima ................ | 359/204.1 |
| 7,379,084 B2 | * | 5/2008 | Kobuse ................... | 347/235 |
| 7,446,794 B2 | * | 11/2008 | Iwamoto .................. | 347/241 |
| 7,535,613 B2 | * | 5/2009 | Baik ........................ | 347/233 |
| 7,544,945 B2 | * | 6/2009 | Tan et al. ................. | 250/341.1 |

* cited by examiner

Primary Examiner—Jerome Grant, II
(74) Attorney, Agent, or Firm—Muncy, Geissler Olds & Lowe, PLLC

(57) ABSTRACT

An in-line laser scanning unit (LSU) with multiple light beams is disclosed. The LSU includes a minimized in-line mirror set composed by a plurality of vertically stacked Micro Electronic Mechanical System (MEMS) oscillatory mirrors and a linear corresponding scanning lens set formed by a plurality of F-Sin θ lens stacked vertically so as to correct the variation of reflective angle of the oscillatory mirror that is sinusoidal in time. Thus the scanning speed of multiple laser beams on the image plane is constant. Therefore, the volume of color printers is effectively reduced and the scanning efficiency is improved when the LSU in accordance with the present invention is applied to the optical engines of color printers.

11 Claims, 10 Drawing Sheets

(A)  (B)

(A)  (B)

IN-LINE LASER SCANNING UNIT WITH MULTIPLE LIGHT BEAMS

BACKGROUND OF THE INVENTION

The present invention relates to a laser scanning unit (LSU) with multiple light beams, especially to a LSU having a Micro Electronic Mechanical System oscillatory mirror set composed of vertically stacked Micro Electronic Mechanical System (MEMS) arrays and a linear corresponding scanning lens set consisting of a plurality of F-Sin θ lens stacked vertically for minimizing volume of color printers and improving scanning efficiency.

There are many patents disclosing applied techniques in connection with laser beam printer (LBP) such as U.S. Pat. Nos. 5,128,795, 5,162,938, 5,329,399, 5,710,654, 5,757,533, 5,619,362, 5,721,631, 5,553,729, 5,111,219, 5,995,131, 6,724,509 and Japanese patent Nos. 4-50908 and 5-45580. A conventional Laser Beam Printer includes a laser scanning unit that uses a laser diode as a light source. A light beam emitted from the laser diode passes a collimator lens and becomes a parallel light bean, then through a cylinder lens for converging the light beam that passes along Y axis of a sub-major scanning direction, and directly transmits the light beams along X-axis of a main scanning direction so as to form a line image. The laser scanning unit also includes a polygonal mirror that is adapted to rotate at high speed so that a plurality of reflection mirrors uniformly and continuously arranged on the polygonal mirror are just located at or in the vicinity of a focal point of the above-mentioned line image. The polygon mirror that deflects the at least one light beam is disposed near or in focus of above image for controlling projecting direction of the laser beam so as to make the laser beam move parallel to X-axis of the main scanning direction in a constant angular velocity, and then being deflected to a fθ lens. The fθ lens is located at one side of the polygonal mirror and it can be a single-element scanning lens, or a two-element scanning lens, as disclosed in U.S. Pat. No. 5,995,131. The fθ lens projects the light beams deflected from the polygon mirror onto an image plane or a photoreceptor drum so as to achieve requirement of scanning linearity.

However, the above-described conventional laser scanning unit has the following disadvantages:

(1) The rotary polygonal mirror in the conventional laser scanning unit is very difficult to make and is with high manufacturing cost. Thus the cost of the laser scanning unit can't be reduced.

(2) Generally, the reflection mirrors on the polygonal mirror have a very small mirror width in the direction of Y-axis. Thus it is necessary to add a cylindrical lens inside the conventional laser scanning unit so as to make laser beams through the cylindrical lens be focused to form a line (or a point on Y-axis) before being projected onto the reflection mirrors of the polygonal mirror. Therefore, the conventional laser scanning unit has increased number of elements and requires increased assembling operations.

(3) The conventional polygonal mirror generates relatively high noises and it takes relatively long waiting period for the polygonal mirror to reach a working rotational speed after the laser scanning unit being initiated.

(4) When designing the fθ lens of conventional LSU, it is necessary to consider a deviation from the axis of the polygonal mirror. Thus, it is more difficult in design and manufacturing of the fθ lens.

Moreover, the laser scanning unit applied in conventional Laser Beam Printers needs to control reflective direction of a plurality of (such as four) laser beams for achieving requirement of scanning linearity synchronously. Examples of such patents include U.S. Pat. Nos. 6,798,820, 6,839,074 and 6,914,705. However, above LUS modules disclosed still use a polygonal mirror rotating at high speed to control reflection direction of multiple laser beams so that they not only have above disadvantages mentioned above but also have more complicated structure and disposition. This increases difficulties in design tasks and volume of color printers. Therefore, the requirements of compact size and light weight can't be met.

SUMMARY OF THE INVENTION

Therefore it is a primary object of the present invention to provide an in-line laser scanning unit with multiple light beams that uses MEMS array having a plurality of MEMS oscillatory mirrors stacked vertically. Moreover, a F-Sin θ linear scanning lens is used to replace conventional F-θ linear scanning lens. The F-Sin θ linear scanning lens can correct the variation of reflective angle of the MEMS harmonic moved oscillatory mirror that is sinusoidal in time. And a plurality of F-θ lens is stacked vertically into an in-line linear scanning lens set that corresponds to the in-line oscillatory mirror set so as to make the scanning speed of multiple laser beams on the image plane to be constant. Therefore, the volume of color printers is effectively reduced and the scanning efficiency is improved.

It is another object of the present invention to provide an in-line laser scanning unit with multiple light beams that designs with a F-Sin θ lens. Because when the MEMS mirror in harmonic motion reflects the laser beam, the spot-to-spot spacing on the image plane decreases with time. That means the scanning speed of laser spot on the image plane is not constant. The F-Sin θ lens is used to correct variation of reflective angle sinusoidal in time so as to correct unequal scanning speed of laser spots on the image plane into constant scanning speed. Thus the scanning speed of laser spot projected on the image plane is constant. Therefore, a scanning linearity required by the laser scanning unit is achieved.

It is a further object of the present invention to provide an in-line laser scanning unit with multiple light beams composed of a semiconductor laser set, a collimator lens set, a micro electronic mechanic system (MEMS) oscillatory mirror set, and a F-Sin θ lens set. The semiconductor laser, collimator lens, micro electronic mechanic system (MEMS) oscillatory mirror, and in-line F-Sin θ linear scanning lens used therein can be one-to-one correspondence. For example, four laser beams are emitted from one/two/four semiconductor laser while four collimator lens, four micro electronic mechanic system (MEMS) oscillatory mirror, and four F-Sin θ linear scanning lens are used and corresponding to each laser beam. Thus specification of each set of elements is standardized for mass production and easy assembling.

It is a further object of the present invention to provide an in-line laser scanning unit with multiple light beams composed of a semiconductor laser set, a collimator lens set, a micro electronic mechanic system (MEMS) oscillatory mirror set, and a F-Sin θ lens set. The semiconductor laser, collimator lens, micro electronic mechanic system (MEMS) oscillatory mirror, and in-line F-Sin θ linear scanning lens used therein can be adjusted according to users needs. For example, a semiconductor laser emits two laser beams and then two collimator lens, two micro electronic mechanic system (MEMS) oscillatory mirror, and two F-Sin θ linear scanning lens are used for corresponding to the laser beams. Thus the volume of the device is minimized and selectivity of each element is increase. Therefore, the design is convenient for mass production with reduced manufacturing cost.

It is a further object of the present invention to provide an in-line laser scanning unit with multiple light beams that a cylindrical lens set can be disposed between the collimator lens set and the micro electronic mechanic system (MEMS) oscillatory mirror or not according to users needs. Therefore, the elements and assembling operations of laser scanning units are simplified.

DETAILED DESCRIPTION OF THE PREFFERED EMBODIMENT

Figure 1:
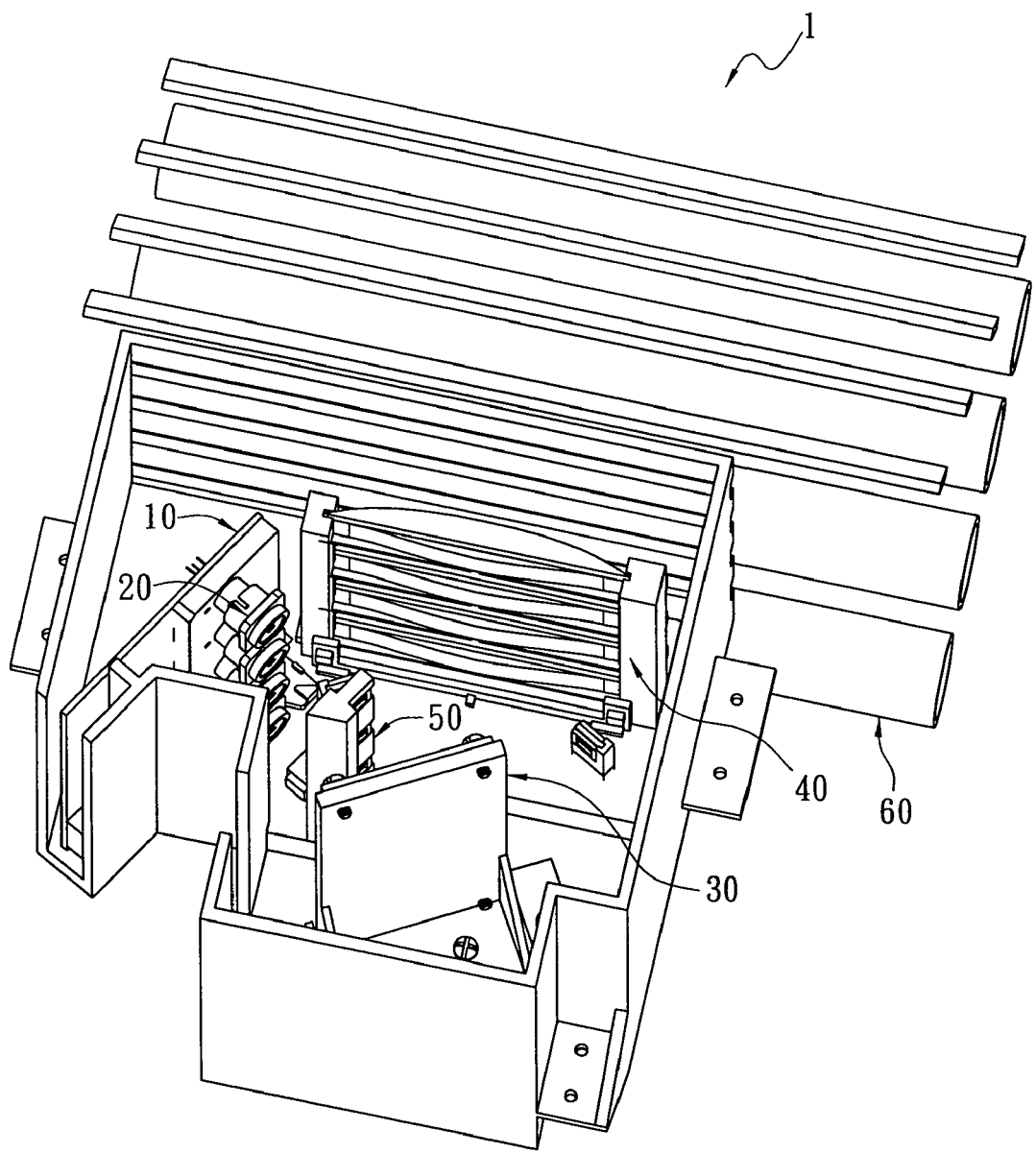
FIG. 1 is a perspective view of an embodiment in accordance with the present invention.
Figure 2:
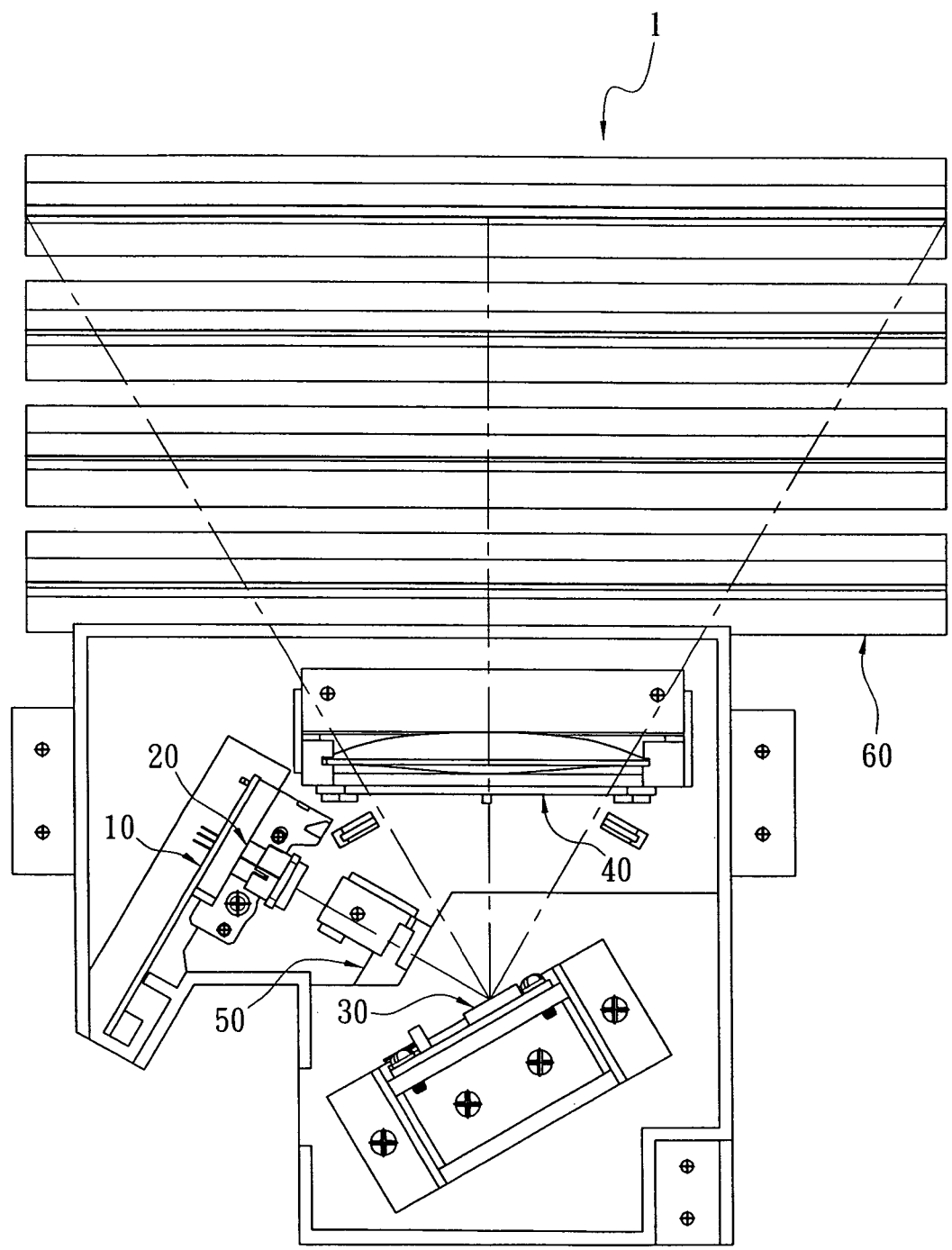
FIG. 2 is a top view of the embodiment in FIG. 1.
Figure 3:
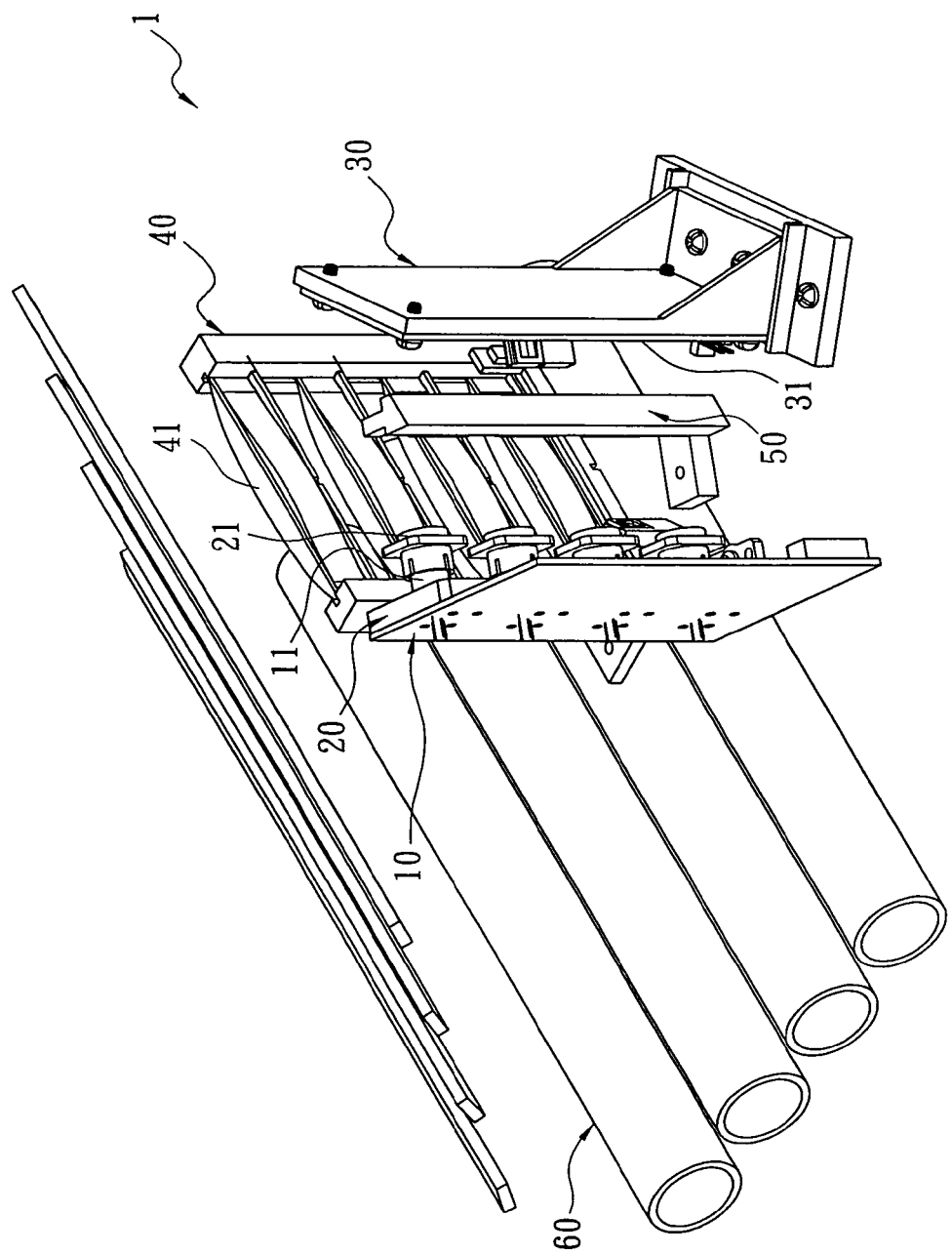
FIG. 3 is a partial perspective view of the embodiment in FIG. 1 without the housing.
Figure 4:
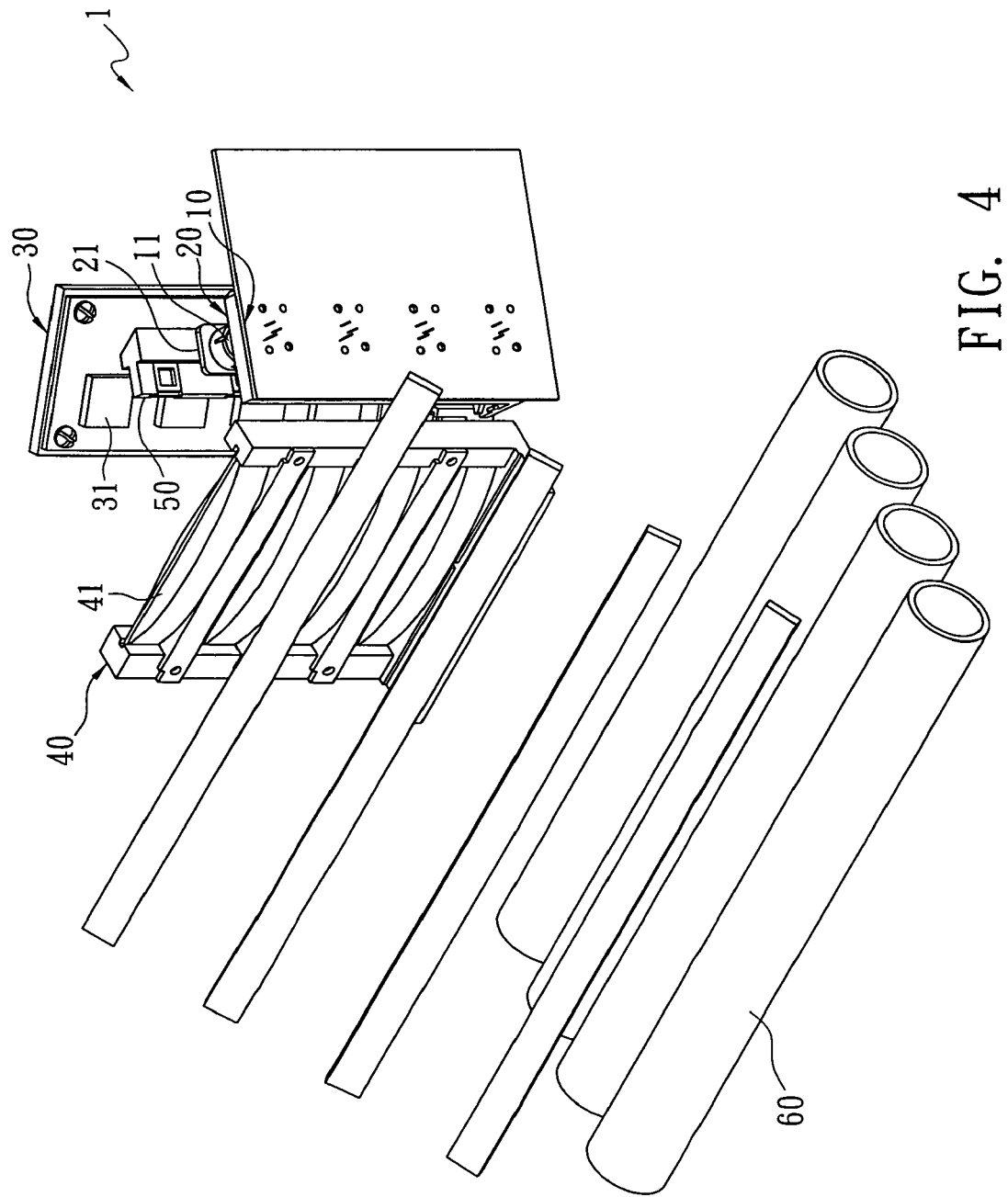
FIG. 4 is a perspective view of the embodiment in FIG. 3 from another angle of view.
Figure 6:
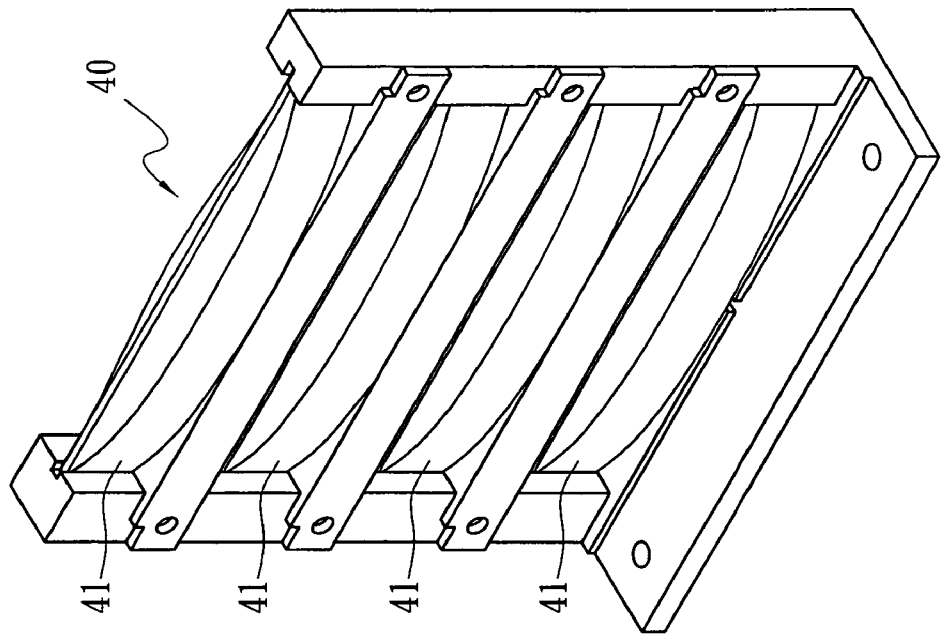
FIG. 6 is an enlarged view of an in-line F-Sin θ lens set of an embodiment in accordance with the present invention.
Figure 5:
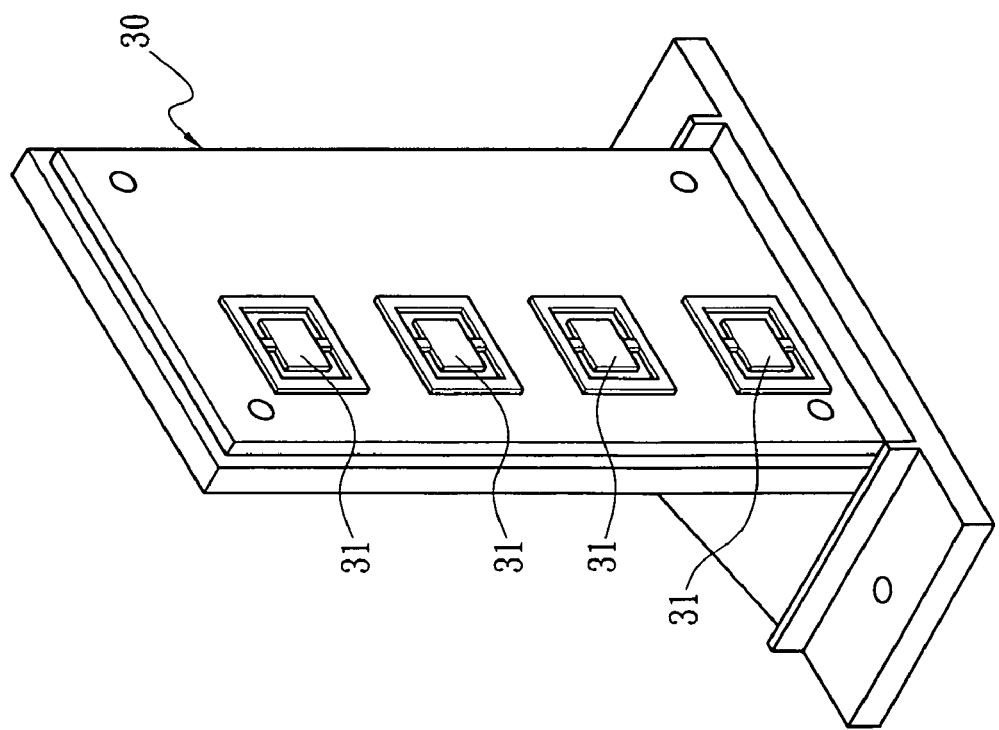
FIG. 5 is an enlarged view of Micro Electronic Mechanical System (MEMS) array oscillatory mirror set of an embodiment in accordance with the present invention.
Figure 8:
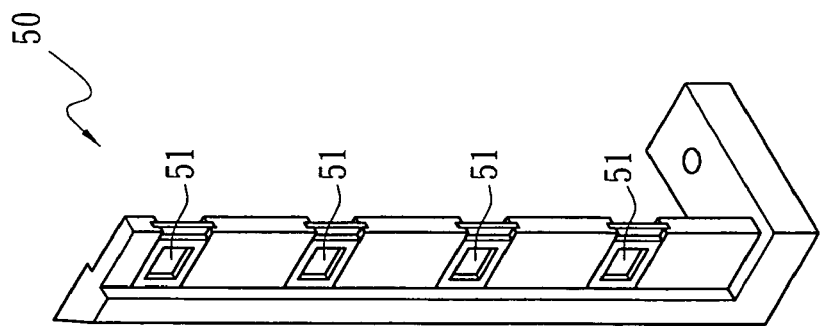
FIG. 8 is an enlarged view of an in-line cylindrical lens set of an embodiment in accordance with the present invention.
Figure 7:
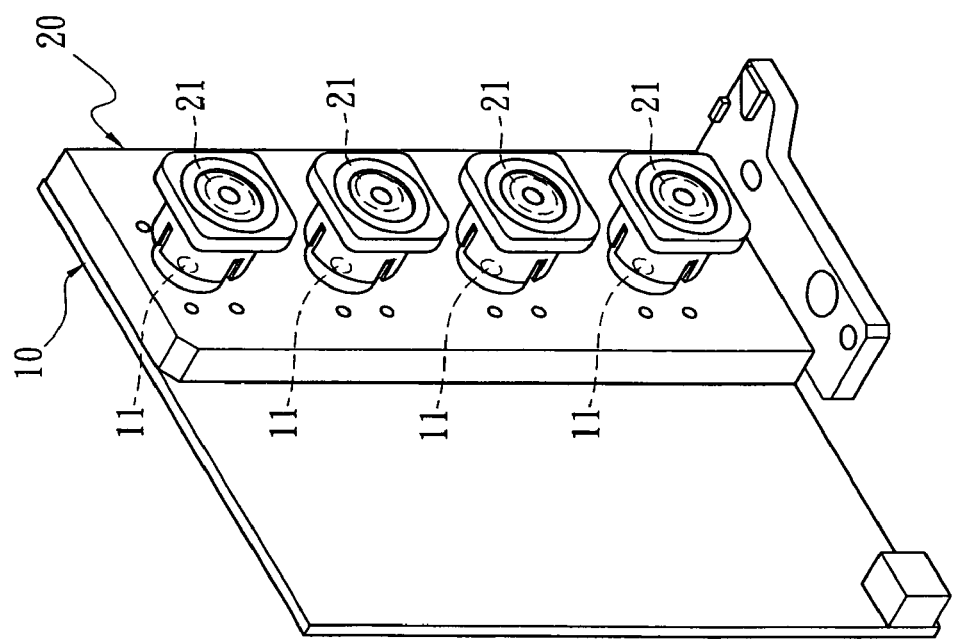
FIG. 7 is an enlarged view of an in-line collimator lens set of an embodiment in accordance with the present invention.
Figure 9A:
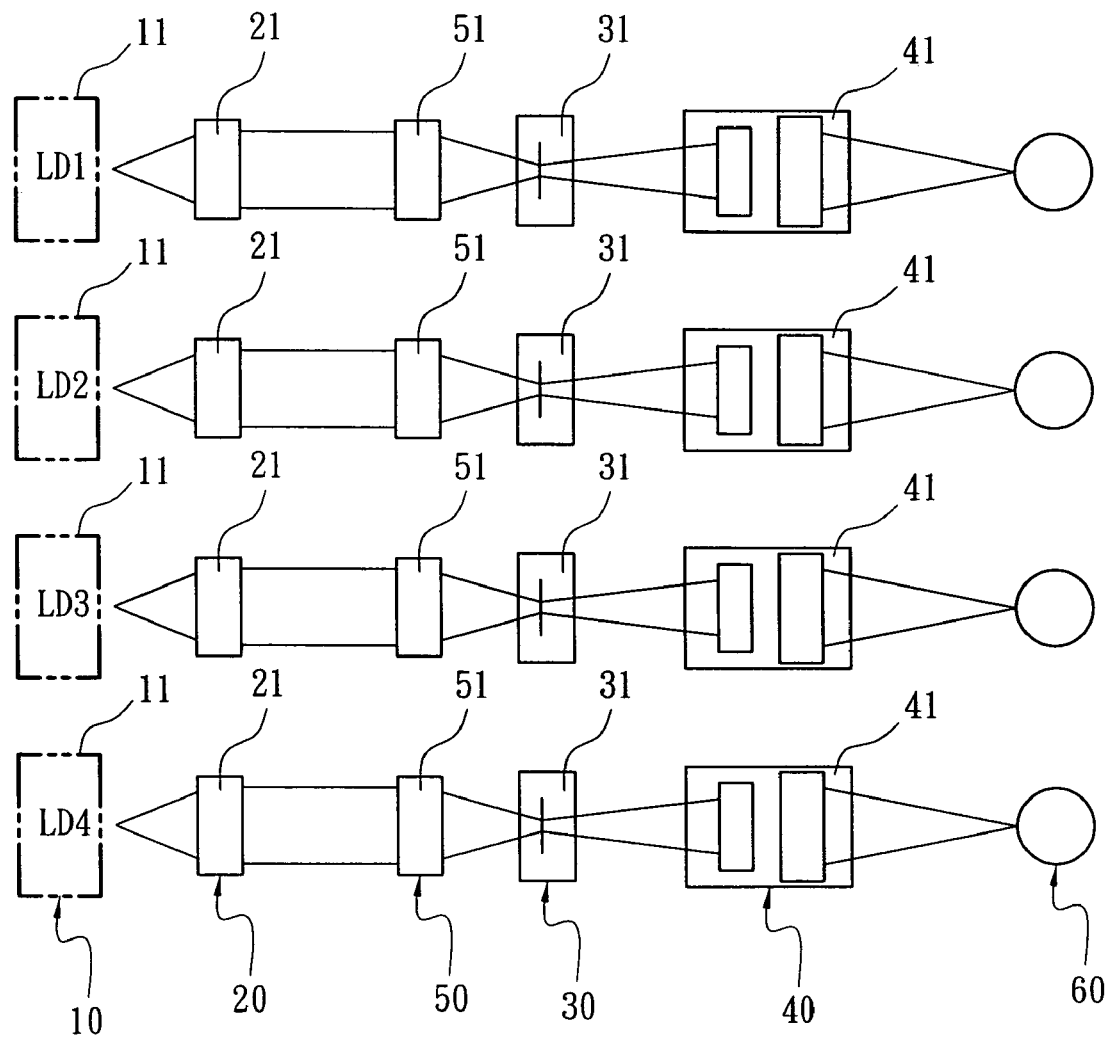
FIGS. 9(A). (B) & (C) are optical paths of the embodiment in FIG. 1 and other two embodiment in accordance with the present invention.
Figure 9B:
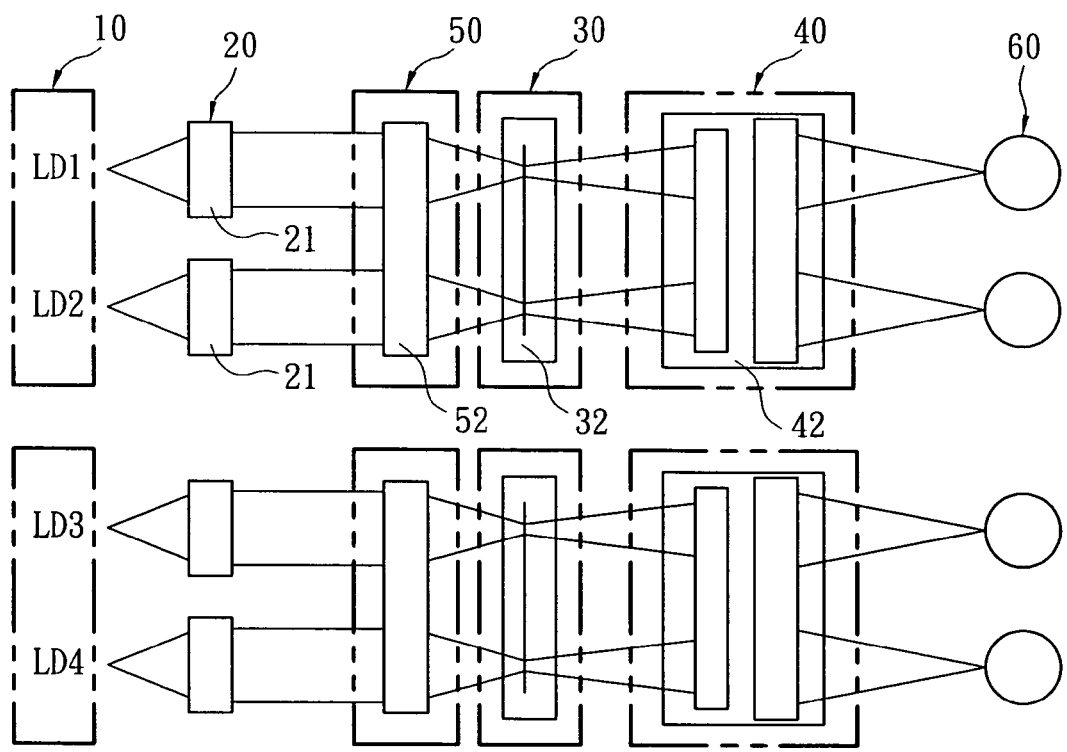
Figure 9C:
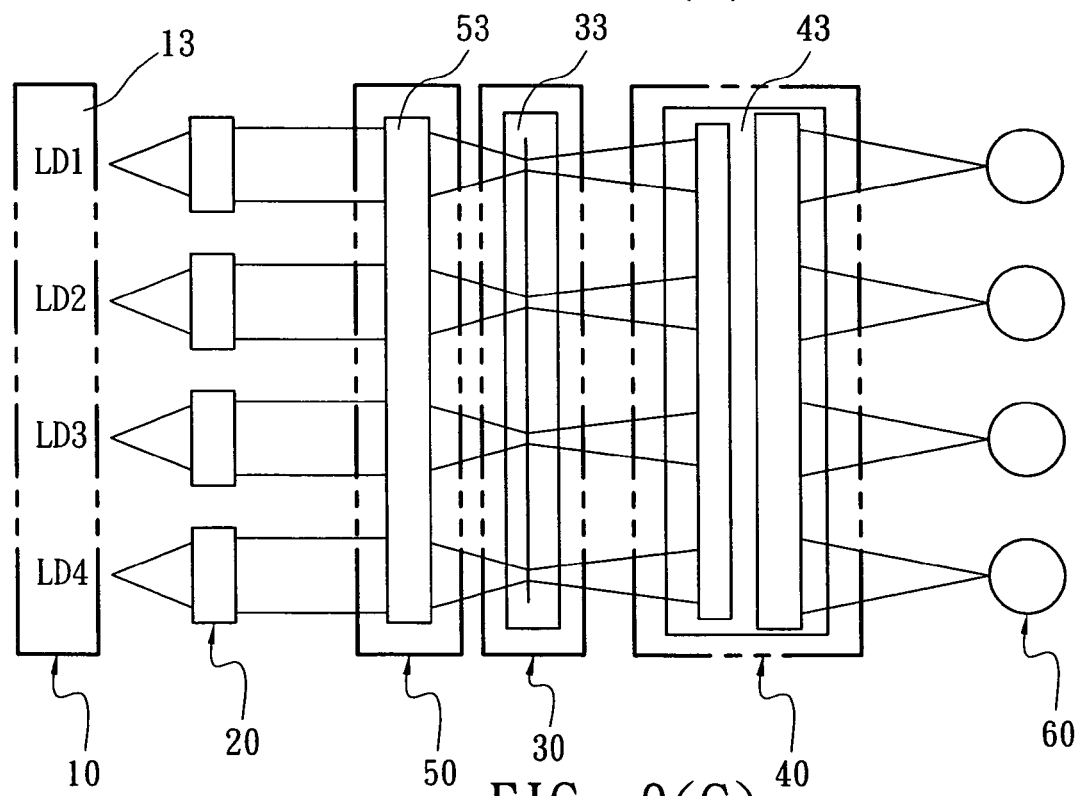

Refer from FIG. 1 to FIG. 7, a laser scanning unit (LSU) with multiple light beams 1 in accordance with the present invention consists of a semiconductor laser set 10, a collimator lens set 20, a micro electronic mechanic system (MEMS) oscillatory mirror set 30, and a linear scanning lens set 40. The semiconductor laser 10 is composed of four sets of single-beam laser diode 11 and each of the single-beam laser diode 11 emits a laser beam, as shown in FIG. 9(A). Or the semiconductor laser 10 is formed by two sets of dual-beam Laser Diode 12 that emits two laser beams, as shown in FIG. 9(B). The semiconductor laser 10 can be a TO-Can (laser diode packages) semiconductor device that produces four laser beams 13, as shown in FIG. 9(C), or a multi-beam semiconductor laser diode. In this embodiment, the four sets of single-beam laser diode 11, the two sets of dual-beam Laser Diode 12, the TO-Can semiconductor device 13 or the multi-beam semiconductor laser diode is preferably in an array structure, being stacked vertically, as shown in FIG. 1 to FIG. 4 and FIG. 7. In FIG. 7, each collimator 21 is respectively disposed on front side of collimator kit while the other side of the collimator kit is arranged with a laser diode 11.

The four laser beams emitted from the semiconductor laser set 10 respectively passes through the collimator lens set 20 to form parallel beams. The collimator lens set 20 consists of a plurality of collimator lens such as four sets of collimator lens 21, as shown from FIG. 1 to FIG. 4 & FIG. 7, or comprising a single collimator lens with larger numerical aperture (not shown in figure). Lenses with larger numerical apertures means that the device has ability to collect more light from laser beams so as to make the collimator lens set 20 receive four laser beams from the semiconductor laser set 10 and respectively form a parallel light beam that is emitted to the MEMS oscillatory mirror set 30. In this embodiment, the four sets of collimator lens 21 are stacked vertically in an array so as to correspond to each of the four laser beams, as shown in FIG. 9(A).

After the four laser beams passing through the collimator lens set 20 and then being projected, respectively passes through a cylindrical lens set 50 which includes four cylindrical lens 51, as shown from FIG. 1 to FIG. 4, FIG. 8 & FIG. 9(A), two sets of cylindrical lens 52, as shown in FIG. 9(B), or one set of cylindrical lens 53, as shown in FIG. 9(C). The main function of the cylindrical lens is to cause a width of the parallel beams in a sub-major scanning direction or Y-axis to focus in a direction parallel to a major scanning direction or X-axis and thereby form a line image on an image plane set 60. However, there is no high speed rotated polygonal mirror being used in the present invention so that the cylindrical lens set 50 can be disposed or not according to users needs. Once the cylindrical lens set 50 is disposed, the four cylindrical lens 51, two sets of cylindrical lens 52, or one set of cylindrical lens 53 are preferably stacked vertically in an array so as to correspond to each of the four laser beams.

The four laser beams passing through the cylindrical lens set 50 are respectively projected onto the MEMS oscillatory mirror set 30 that is a MEMS array structure formed by a plurality of MEMS oscillatory mirrors 31 stacked vertically into an array. In this embodiment, the MEMS oscillatory mirror set 30 is composed of four MEMS mirror 31, each of which corresponds to a laser beam, as shown from FIG. 1 to FIG. 4 & FIG. 5, or two MEMS mirrors 32 whose longitudinal width (height) is larger than that of the MEMS mirror 31 so as to make each MEMS mirror 32 corresponds to two laser beams, as shown in FIG. 9(B). Or the MEMS oscillatory mirror set 30 can be one MEMS mirror 33 whose longitudinal width (height) is larger than that of the MEMS mirror 32 so that the MEMS mirror 33 corresponds to four laser beams, as shown in FIG. 9(C). Furthermore, in this embodiment, the four MEMS mirror 31, the two MEMS mirrors 32 or the one MEMS mirror 33 are stacked vertically into an array structure so as to reduce volume of the laser scanning unit with multiple light beams, as shown from FIG. 1 to FIG. 5, FIG. 9(B) & FIG. 9(C). Thus the volume of color prints is further minimized so as to achieve requirements of compact size and light weight.

Moreover, by harmonic motion of the mirrors 31/32/33 of the MEMS oscillatory mirror set 30, the four laser beams respectively are reflected into the linear scanning lens set 40. And then through the refraction of the linear scanning lens set 40, the four laser beams are respectively projected onto the image plane 60 at constant scanning speed so as to achieve requirement of scanning linearity of the laser scanning unit. The linear scanning lens set 40 is formed by a plurality of F-sin θ lens 41 stacked vertically into an array structure. In this embodiment, the linear scanning lens set 40 is composed of four F-sin θ lens 41 that stack vertically into an array structure, as shown from FIG. 1 to FIG. 4, FIG. 6, and FIG. 9(A). Each of the F-sin θ lens 41 corresponds to a refracted laser beam, as shown in FIG. 9(A). In combination with the MEMS oscillatory mirror set 30, the volume of the laser scanning unit with multiple light beams is effectively reduced. In addition, the linear scanning lens set 40 can consists of two F-sin θ lens 42, as shown in FIG. 9(B), or one F-sin θ lens 43, as shown in FIG. 9(C). And each F-sin θ lens 41/42/43 can be design into a single-element (single piece), a single-element (double-piece) or a multiple-element (multiple piece) scanning lens.

In usage, four laser beams are emitted from the semiconductor laser set 10. And then each of the laser beam passes through the collimator lens set 20 to form a parallel light beam which is able to pass or not to pass through the cylindrical lens set 50. The micro electronic mechanic system (MEMS) oscillatory mirror set 30 may oscillate in a harmonic motion at a certain oscillating amplitude, so as to control a direction in which incident laser beams are respectively reflected and cause each of the laser beams to reflect onto the F-Sin θ linear scanning lens set 40 located at one side of the MEMS oscillatory mirror set 30. Then the four laser beams are respectively projected onto the image plane 60. Therefore, a scanning linearity required by the laser scanning unit is achieved.

As for the harmonic motion of the MEMS oscillatory mirror set 30, the present invention uses a F-sin θ lens as lens for linear scanning so as to achieve a requirement of scanning linearity. The features and functions of the F-sin θ lens 23 are different from original F-θ lens and the following are detailed descriptions:

A polygon mirror with constant rotation speed is adopted in a traditional laser scanning unit (LSU) to reflect the laser beam on OPC (organic photoconductor drum).

While the reflective angle of laser beam by polygon mirror satisfies the equation below:

$$\theta(t) = \omega * t \qquad E(1)$$

ω is the rotation speed of the polygon mirror

Figure 10:
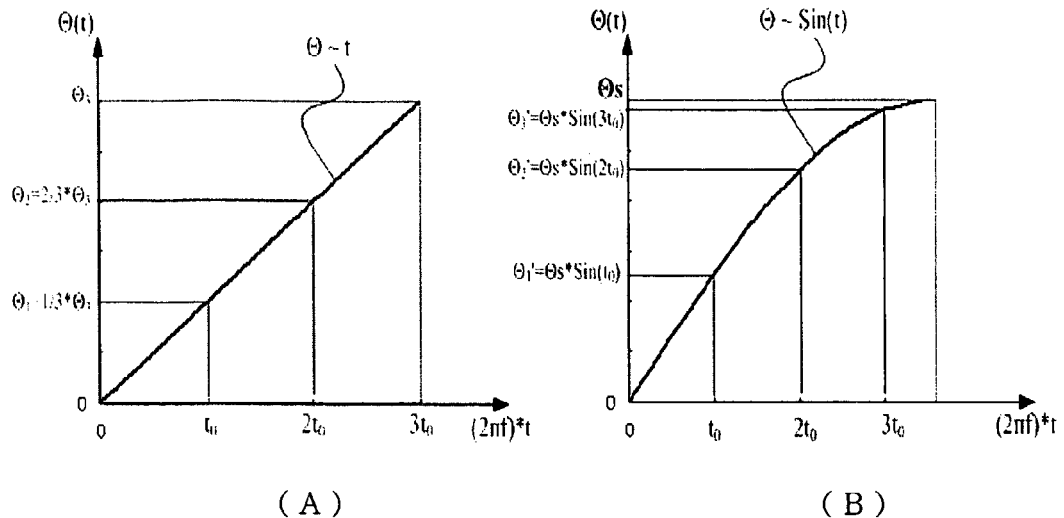
FIGS. 10(A) & (B) are scanning angle θ vs normalized time.
Figure 11:
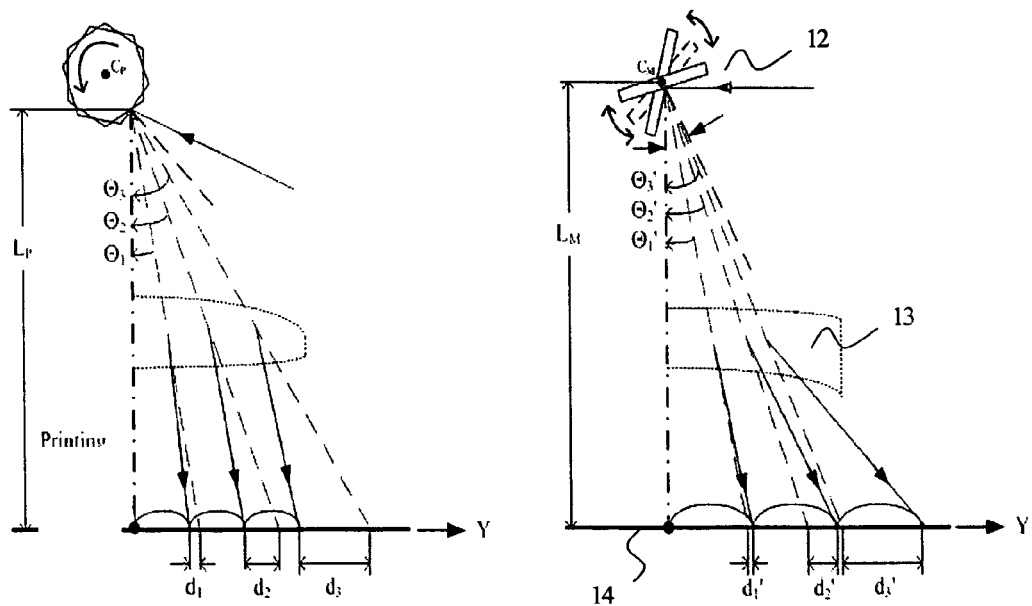
FIGS. 11(A) & (B) respectively are Scanning spot trajectory of the polygon mirror and the MEMS mirror.

As shown in FIG. 10(A) & FIG. 11(A), due to a polygon mirror with constant angular speed, i.e. ω is constant, the reflective angle is proportional to time t. That is, the variation of reflective angle with time is equal in equal time interval. Then the laser beam reflected by mirror is focused on image plane, and the position of laser spot, i.e. Y', along Y direction satisfies the equation below:

$$Y' = L_P * \mathrm{Tan}(\theta(t)) \qquad E(2)$$

Lp is the distance between mirror surface and image plane

As the dashed line in FIG. 11(A) shows, the spot-to-spot spacing increases with time and that means the scanning speed of laser spot on image is not constant but increasing linearly. However, that is not allowed in the optical system of LSU. We need a lens not only to focus a laser plane beam but also to correct the position of laser spot. Then the spot-to-spot spacing will be equal in equal time interval, i.e. the scanning speed of the laser spot is constant on the image plane and make the position of laser spot Y' satisfies the equation below $$Y' = F * \theta(t) \qquad E(3)$$

F is the focal length of lens

Figure 12:
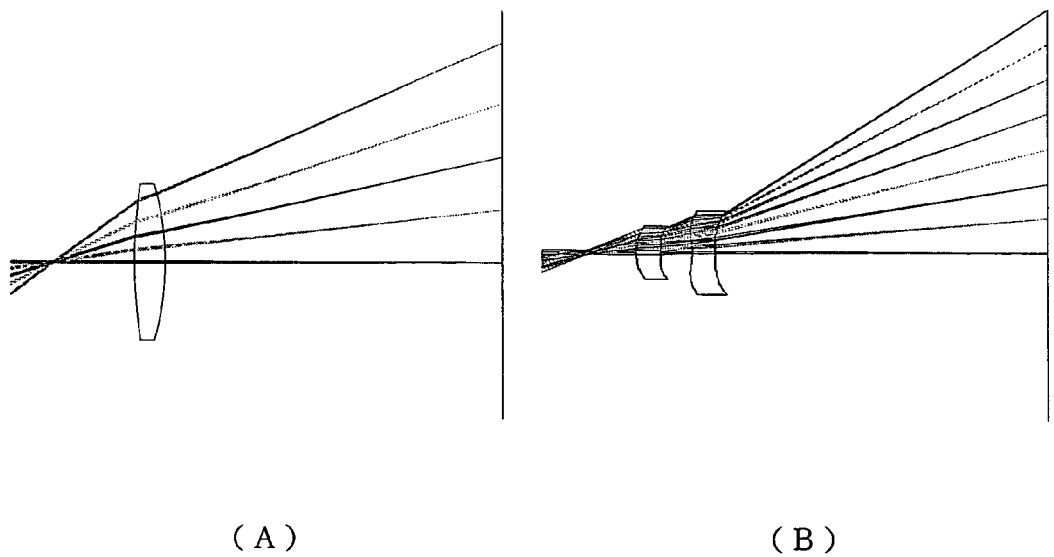
FIGS. 12(A) & (B) respectively are optical layout of LSU of the polygon mirror and the MEMS mirror.

As the solid line in FIG. 11(A) shows, the variation of reflective angle is equal in the equal time interval. Refer to Equation (3), it is learned that change of the position of laser spot Y' is in equal spacing. Thus we call this special lens with functions of correction of spot size and correcting spot trajectory with constant scanning speed as a F-θ Lens. As FIG. 12(A) shows, from the view of optical design, intentionally the special lens produce a "negative distortion" or "barrel distortion", i.e. bending the beam through the F-θ lens from the original beam path toward the printing center. Besides, the positional deviation of the laser spot on the image plane between bended beam and original beam is increasing from center to outer, as shown in FIG. 11(A)(d1,d2,d3).

The present invention discloses a LSU with a MEMS mirror instead of a LSU with a polygon mirror. The behavior of a MEMS mirror which differs from a polygon mirror is a harmonic motion, and the relationship between reflective angle of laser beam θ and time t satisfies the equation below:

$$\theta(t) = \theta s * \mathrm{Sin}(2\pi f * t) \qquad E(4)$$

f: the scanning frequency of a MEMS mirror
θs: the extreme scanniing angle of reflection beam As FIG. 10(B) shows, the variation of reflective angle is not equal but decreasing with sinusoidal function of time t. A complete oscillation of a MEMS mirror is a full period, however, FIG. 1(b) shows merely a quarter period, and the reflection angle is the extreme reflective angle θs at this moment.

As FIG. 11(B) shows, the position of laser spot Y' satisfies E(2), and from E(4) and E(2) we can get:

$$Y' = L_M * \mathrm{Tan}[\theta s * \mathrm{Sin}(2\pi f * t)] \qquad E(5)$$

$L_M$: the distance between the reflective surface of mirror and image plane

The equation E(5) shows that the spot-to-spot spacing decreases with time, i.e. the scanning speed of laser spot on the image plane is not constant but decreasing with time. However, it differs from polygon mirror. So we also, need a special lens to correct this error and make the scanning speed of laser spot on the image plane to be constant. Due to the variation of reflective angle with sinusoidal function of time, we call this special lens as a F-Sin θ lens. The F-Sin θ lens intentionally produces a "positive distortion or pinchshion distortion" in optical design. The laser beam through the F-Sin θ lens will be bended toward printing end from original beam path. As FIG. 11(B) shows, the positional deviation such as d1, d2, d3 of the laser spot on the image plane between the bended beam and original beam is increasing from center to outer.

Figure 13:
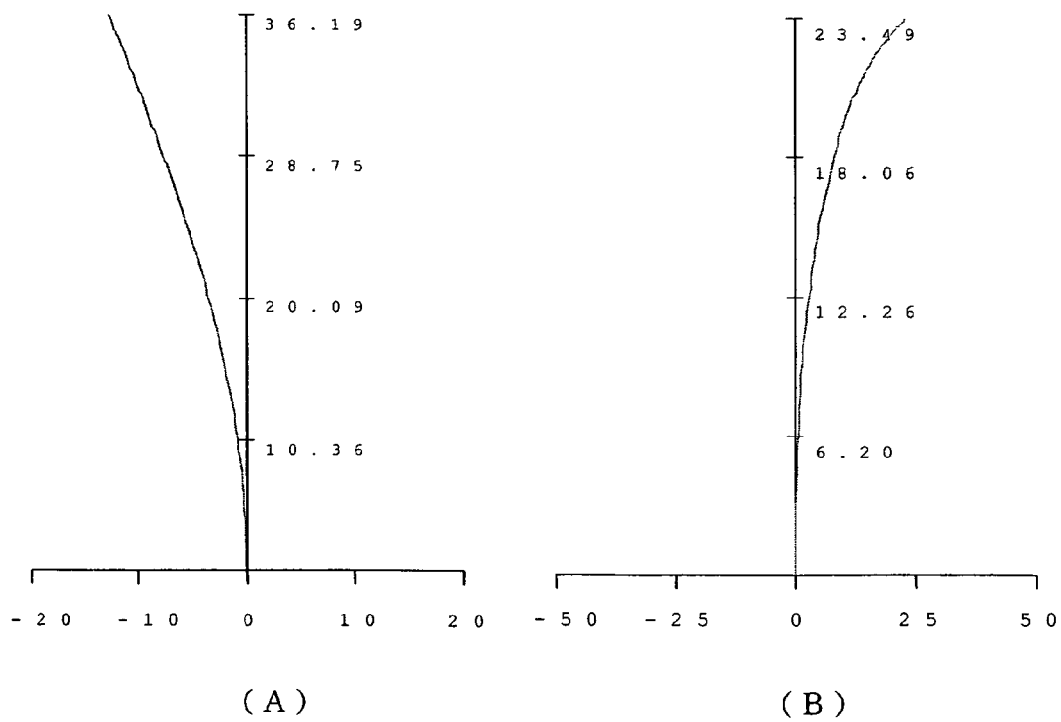
FIGS. 13(A) & (B) are optical characteristics of distortion generated by F-θ Lens and F-Sin θ of the polygon mirror and the MEMS mirror respectively.

Refer to FIGS. 12(A) & (B), lens in optical systems all get function of correcting position of laser spot so as to make the scanning speed of the laser spot is constant on the image plane. That is the spot-to-spot spacing will be equal in equal time interval. Refer to FIG. 13(A), it shows optical features of "negative distortion" or "barrel distortion" while optical features of "Positive Distortion" or "Pincushion Distortion" is shown in FIG. 13(B).

The present invention includes a plurality of MEMS oscillatory mirrors 31/32 stacked vertically into an array mirror set 30, and a plurality of F-Sin θ lens 41/42 to form an in-line linear scanning lens set 40. The conventional LSU disclosed in U.S. Pat Nos. 6,798,820, 6,839,074, and 6,914,705 consists of a rotary polygonal mirror and F-θ lens. Thus the present invention has different features compare with conventional LSU and has following advantages:

(1) While being applied to optical engines of color printers, the present invention effectively reduces volume of color printers and improves scanning efficiency.

(2) It is no longer necessary to include a cylindrical lens in the laser scanning unit, allowing the fθ lens to have an optical design with more robustness and higher tolerance.

(3) While designing the fθ lens, only a symmetric optical field need to be considered and thereby the design as well as manufacturing of the fθ lens is simplified.

(4) Once the harmonic motion of the MEMS oscillatory mirror is started, a working rotational speed thereof is quickly reached almost without any waiting period. Moreover, the MEMS oscillatory mirror may have a higher operating speed than the polygon mirror that is driven to rotate by an airbearing motor. Therefore, the MEMS oscillatory mirror has improved scanning amplitude efficiency.

(5) The harmonic motion of the MEMS oscillatory mirror includes flip-flop oscillations at regular oscillating amplitude to allow bi-directional scanning. Therefore, when the operating speed is the same, the bi-directional scanning of the MEMS oscillatory mirror is twice as quick as the one-directional scanning of the polygonal mirror, enabling the laser scanning unit of the present invention to have improved scanning efficiency.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An in-line laser scanning unit (LSU) with multiple light beams comprising a semiconductor laser set, a collimator lens set, a micro electronic mechanic system (MEMS) oscillatory mirror set, and a F-sin θ linear scanning lens set;

the semiconductor laser set emits a plurality of laser beams and respectively emitted onto the collimator lens set;

the collimator lens set receives laser beams from the semiconductor laser set and form parallel light beams respectively being emitted to the MEMS oscillatory mirror set; axis of each laser beam corresponds to oscillatory axis of the MEMS oscillatory mirror set;

the micro electronic mechanic system (MEMS) oscillatory mirror set having a plurality of MEMS oscillatory mirror that stacked vertically into a MEMS array structure; by the MEMS oscillatory structure oscillating in harmonic motion at regular oscillating amplitude, the incident laser beams are reflected from each oscillatory mirror onto the F-sin θ linear scanning lens set; and the F-sin θ linear scanning lens set having a plurality of F-sin θ lens stacked into an array structure and each of the F-sin θ lens corresponds to a laser beam being reflected by the MEMS oscillatory mirror; the F-sin θ lens corrects the variation of reflective angle sinusoidal in time of the MEMS oscillatory mirror so as to make the scanning speed of laser beam on the image plane to be constant;

thereby a plurality of laser beams emitted from the semiconductor laser set respectively passes through the collimator lens to form parallel beams, each of which is emitted to the MEMS oscillatory mirror; then each of the laser beams is reflected onto the F-sin θ lens by the oscillatory mirror oscillating in harmonic motion at regular oscillating amplitude; the F-sin θ lens corrects the variation of reflective angle of the MEMS harmonic moved oscillatory mirror that is sinusoidal in time as to make the scanning speed of multiple laser beams on the image plane to be constant for achieving requirement of scanning linearity.

2. The in-line laser scanning unit with multiple light beams as claimed in claim 1, wherein the F-sin θ lens corrects the variation of reflective angle sinusoidal in time so as to correct unequal scanning speed of laser spots on the image plane into constant scanning speed because when the MEMS mirror in harmonic motion reflects the laser beam, the spot-to-spot spacing on the image plane decreases with time and the scanning speed of laser spots on the image plane are not constant.

3. The in-line laser scanning unit with multiple light beams as claimed in claim 1, wherein central axis of the laser beams aligns with mechanical center of the MEMS oscillatory mirror.

4. The in-line laser scanning unit with multiple light beams as claimed in claim 1, wherein the F-Sin θ lens is a single-element lens, a double-element lens, or a multiple-element lens.

5. The in-line laser scanning unit with multiple light beams as claimed in claim 1, wherein the semiconductor laser set having at least one single beam semiconductor laser.

6. The in-line laser scanning unit with multiple light beams as claimed in claim 1, wherein the semiconductor laser set having at least one multiple beam semiconductor laser.

7. The in-line laser scanning unit with multiple light beams as claimed in claim 1, wherein the collimator lens set having a plurality of collimator lens stacked vertically into an array.

8. The in-line laser scanning unit with multiple light beams as claimed in claim 1, wherein the collimator lens set having a single collimator lens with larger numerical aperture.

9. The in-line laser scanning unit with multiple light beams as claimed in claim 1, wherein a mirror of the MEMS oscillatory mirror set has proper longitudinal width so as to make the mirror correspond a plurality of laser beams simultaneously.

10. The in-line laser scanning unit with multiple light beams as claimed in claim 1, wherein a cylindrical lens set is disposed between the collimator lens set and the micro electronic mechanic system (MEMS) oscillatory mirror set so that laser beams respectively passing through the cylindrical lens set are projected onto each mirror of the MEMS oscillatory mirror set.

11. The in-line laser scanning unit with multiple light beams as claimed in claim 10, wherein the cylindrical lens set having a plurality of cylindrical lens stacked vertically into an array.

* * * * *